No. 687,885. Patented Dec. 3, 1901.
G. D'INFREVILLE.
ELECTRIC BATTERY.
(Application filed Jan. 3, 1901.)

(No Model.)

Attest:
Geo H Botts
Edith Sarles

Inventor:
Georges d'Infreville
By Edith J. Griswold
Atty.

UNITED STATES PATENT OFFICE.

GEORGES D'INFREVILLE, OF NEW YORK, N. Y.

ELECTRIC BATTERY.

SPECIFICATION forming part of Letters Patent No. 687,885, dated December 3, 1901.

Application filed January 3, 1901. Serial No. 41,983. (No model.)

*To all whom it may concern:*

Be it known that I, GEORGES D'INFREVILLE, a citizen of the Republic of France, and a resident of New York city, county and State of New York, have invented Improvements in Electric Batteries, of which the following is a specification.

This invention relates to batteries for supplying an electric current, and particularly to accumulators of the lead-zinc type. By my improvements I obviate the serious defects of this form of accumulator and obtain a reversible battery adapted for either open or closed circuit.

My improved battery-cell contains a plate of lead or other suitable conductor covered with or carrying peroxid of lead serving as one electrode and amalgamated zinc or alloy of zinc and mercury as the other electrode, with a solution of sulfuric acid as the electrolyte, the two electrodes being so arranged in the cell that advantage is taken of various natural phenomena relating to the different elements of the cell not utilized in any battery heretofore formed with these elements.

My improved arrangement causes certain changes in the manner of the chemical working of batteries of this type and also adds many advantages in the mechanical manipulation of the same.

Figure 1:
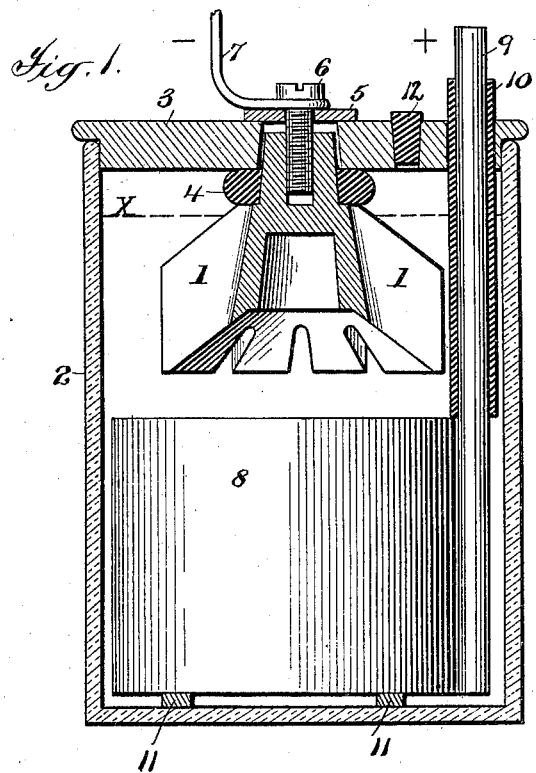
Figure 2:
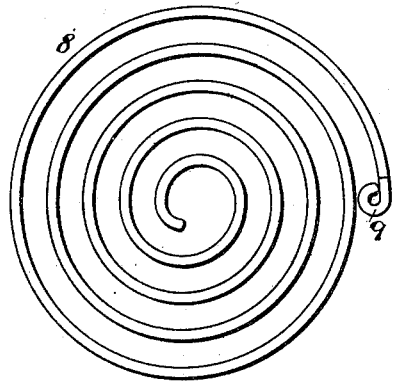

In the accompanying drawings, Figure 1 represents, by way of example, a sectional view of a cell containing the above-mentioned elements arranged according to my invention. Fig. 2 is a plan view of the lead element shown in Fig. 1.

Heretofore with lead-zinc accumulators a number of plates alternately of zinc and lead peroxid have been placed face to face and immersed in the electrolyte on the same level. By my invention the two electrodes are completely separated from each other, all the zinc plates being gathered together or formed in one and situated in the upper strata of the electrolyte and all the lead-peroxid plates collected together beneath the zinc in the lower strata of the electrolyte.

Referring to the drawings, the zinc electrode 1 is supported in any convenient manner in the upper part of the cell 2. In the construction shown the zinc is suspended from the cover 3 of the cell 2. Various forms of zinc electrode of one or more parts may be used, that shown being in the form known as the "wasteless zinc;" but whether single or multiple the zinc electrode must be disposed to face edgewise the lead electrode below it, so as to allow the passage of rising gases. The zinc electrode may be formed of zinc and mercury only; but it will be evident that conductors of other material, such as lead or copper, carrying zinc and mercury may be used, it only being essential that zinc and mercury constitute the operative part of this electrode. With the form shown, to thoroughly protect the connections the upper conical portion of this zinc piece 1 may be drawn up so as to be wedged into a conical hole in the cover 3, or a washer 4, of any suitable material, preferably elastic, may be passed over the upper conical portion of this zinc piece 1 and the conical portion passed partly through the hole in the cover 3 and held by means of a washer 5 and bolt 6—for instance, of iron—screwing directly into the zinc 1. The washer 4 being held tightly between the shoulder of the zinc and the cover 3 prevents the liquid or gases from reaching the connections. Any suitable conductor 7 may be connected to the bolt 6. Paraffin may be used to make tight all the joints about the cover.

The lead electrode may be made in various ways in one or several parts; but it is preferably of the Planté type to better stand the heavy rate of discharge to which the zinc in my battery readily lends itself. The lead electrode shown is in the form of a plate 8, coiled into spiral form, one end of the plate being longer and coiled to form a rod 9 to pass up through the cover 3 for the lead-electrode connection. An insulating-tube 10 is passed over this rod 9. This electrode may rest on supports 11, placed in the bottom of the cell. It will be noted that the walls of this lead electrode are substantially perpendicular to the surface of the electrolyte, their upper edges facing the zinc electrode for a purpose hereinafter mentioned.

Any proper safety device may be used for the escape of an excessive pressure of gas—as, for instance, a cork 12 of any suitable material normally closing a hole in the cover 3, as shown. The electrolyte may reach the dotted line X.

As soon as the amalgamated zinc or alloy of zinc and mercury is placed in the cell the mercury from its weight accumulates in relatively greater quantities toward the lower part of this zinc electrode, where its presence is most needed, as it is there that the greatest amount of chemical action takes place both during the charging and the discharging.

I use but one fundamental solution for the electrolyte—namely, sulfuric acid in water. This solution tends naturally to become denser and denser from the top to the bottom of the cell, so that with my arrangement the solution is of less density exactly where the mercury is less abundant.

During the discharge of the battery sulfate of zinc is formed, (also some sulfate of zinc may be added at the start,) which sulfate of zinc has a lower specific gravity than the sulfuric-acid solution, and thus remains above the latter around the zinc electrode, thereby contributing to the preservation of the zinc from useless attack by the sulfuric-acid solution, especially when the battery is left in open circuit. These natural phenomena thus act to protect the zinc electrode in the position in which I place it in the cell, and consequently a stronger electrolyte than usually employed in this class of batteries can be used and a greater voltage and amperage thereby secured—that is, the percentage of sulfuric acid can be larger than usual without detriment to the zinc, the internal resistance of the cell thereby being appreciably decreased and the electromotive force increased.

If the cell should be shaken, the working thereof will not be much affected, as it is a one-liquid battery, and when at rest the liquid tends to again assume its normal condition of varying density from the top to the bottom.

In the old form of lead-zinc accumulators irregular action takes place, due to the varying density of the electrolyte on the vertical plates at different levels, which causes uneven electromotive forces and internal resistance. In my cell the zinc electrode presents a practically invariable chemical composition at all the time of the charge and discharge, so that the action of the battery is more uniform, and the zinc being consumed mostly from the bottom upward the connections at the top of the cell are free from any injurious attack and are not subject to be partly or wholly separated, as in the old arrangements.

Should any part of the peroxid of lead or the lead itself accidentally get loose, it will simply fall to the bottom of the containing vessel, where in my arrangement it will be harmless, which would be far from being the case were the zinc placed below the lead plate or very near it on the same level. Should any quicksilver fall down, it will fall to the bottom of the jar, where it will remain harmless, and should any of it accidentally amalgamate some part of the lead it will cause no trouble.

In the known arrangement of lead-zinc batteries there is one more zinc plate than lead plate—that is, the two end plates are zinc in order to face the lead electrodes all over to prevent "buckling." In my cell no buckling seems to take place; but if it should there would be no bad effects, as no short-circuiting can occur. Therefore a great advantage in my cell is that I can make the exposed surface of the zinc electrode very much less in extent than that of the lead electrode, and thus reduce the chances of useless attack of zinc.

Not only can the exposed surface of the zinc electrode be greatly reduced by my arrangement, but the entire zinc electrode can be greatly reduced in weight, thus materially lightening the battery.

My lead electrode may be developed to a comparative great surface in many ways—for example, by making it in the form of a spiral zigzag star, &c.—and also it may be made to have a comparatively great height, from the bottom of the jar up to near the zinc electrode. Both sides of my lead electrode are acted upon almost alike, because the walls are placed approximately perpendicular to the zinc electrode, and the electrochemical action on the lead electrode, either in charging or discharging, begins chiefly at the top and goes gradually down horizontally until it reaches the bottom. This manner of acting is of great importance, the action being more uniform and the current resulting therefrom more constant than otherwise, for the peroxid is either formed or reduced to lead by horizontal layers of the same thickness. The relative amount of sulfuric acid in the solution gradually increasing from the top to the bottom, the conductivity also increases from top to bottom, which somewhat compensates for the increasing distance of the active material from the zinc electrode.

From the foregoing it will be seen that the two electrodes are separated, and whether in one plate or piece or in many plates each electrode may in reality be considered as a single piece having interstices that run approximately perpendicular to the surface of the electrolyte.

Besides the improved chemical working of my battery, the handling of the elements of the cell is greatly facilitated. The zinc can easily be removed or lifted by itself from the solution, and also the lead plate can be removed by itself to be examined or stored away when charged, or, if exhausted, to be replaced by a charged lead plate. If the solution contains too much sulfate of zinc, it can easily be replaced by a new sulfuric-acid solution. In fact, the entire cell can be rebuilt in the manner of a primary battery.

Moreover, my battery can be used as a primary battery as well as an accumulator, and it is adapted for either open or closed circuit.

I do not limit myself to any special form or construction of cell or of electrodes or any particular manner of maintaining the parts in position, the principles involved in my invention being applicable to many modifications.

I claim as my invention—

1. In a battery-cell, the combination of a solution of sulfuric acid, with an electrode of zinc and mercury in the upper strata of the solution, and an electrode carrying peroxid of lead in the lower strata of the solution, a clear horizontal stratum of the solution being left between said electrodes.

2. In a battery-cell, the combination of a solution of sulfuric acid, with an electrode of zinc and mercury in the upper part of the cell and having active surfaces approximately perpendicular to the surface of said solution, and an electrode carrying peroxid of lead below the zinc electrode.

3. In a battery-cell, the combination of a solution of sulfuric acid, with an electrode of zinc and mercury in the upper part of the cell, and an electrode carrying peroxid of lead below the zinc electrode, each of said electrodes having interstices that run approximately perpendicular to the surface of said solution.

In testimony whereof I have signed my name to this specification in the presence of two subscribing witnesses.

GEORGES D'INFREVILLE.

Witnesses:
 EDITH SARLES,
 EDITH J. GRISWOLD.